United States Patent [19]

Shin et al.

[11] Patent Number: 5,450,507
[45] Date of Patent: Sep. 12, 1995

[54] FIBER-OPTIC ADDRESS DETECTOR IN PHOTONIC PACKET SWITCHING DEVICE AND METHOD FOR FABRICATING THE SAME

[75] Inventors: Jong-Dug Shin; Min-Yong Jeon; El-Hang Lee, all of Daejeon, Rep. of Korea

[73] Assignee: Electronics and Telecommunications Research Institute, Rep. of Korea

[21] Appl. No.: 354,867

[22] Filed: Dec. 9, 1994

[30] Foreign Application Priority Data

Sep. 10, 1994 [KR] Rep. of Korea .................. 94-22870

[51] Int. Cl.6 ............................................. G02B 6/28
[52] U.S. Cl. .................................... 385/24; 384/147; 384/134
[58] Field of Search .................... 359/140, 173, 115; 385/24, 147, 16, 134

[56] References Cited

U.S. PATENT DOCUMENTS

| | | | |
|---|---|---|---|
| 4,859,019 | 8/1989 | Bevan | 359/115 |
| 5,071,214 | 12/1991 | Jacob et al. | 385/24 |
| 5,206,924 | 4/1993 | Kersey | 385/24 |

OTHER PUBLICATIONS

Prucnal, et al.: "Self-routing photonic switching demonstration . . ."; May 1987; pp. 473–475; vol. 25 No. 5; Optical Engineering.

Eiselt, et al.: "New optical correlator technique for header recognition in self-routing networks"; pp. 199–200; OFC/IOOC 1993 Technical Digest.

Glesk, et al.: "All-optical address recognition and self-routing in a 250 Gbit/s packet-switched network"; Aug. 4, 1994; pp. 1322–1323; Electronics Letters, vol. 30, No. 16.

*Primary Examiner*—Rodney B. Bovernick
*Assistant Examiner*—John Ngo
*Attorney, Agent, or Firm*—Larson and Taylor

[57] ABSTRACT

A fiber-optic address detector comprises fiber-optic delay lines on one surface of which a metal thin film is evaporated, the fiber-optic delay lines being connected in a melting state to fiber-optic couplers, wherein inputting address photonic signals are tapped by the inputting fiber-optic couplers, reflected by the metal thin films at the end portion of the fiber-optic delay line and then re-combined by the inputting fiber-optic coupler, whereby it can reduce the number of the fiber-optic coupler used in the conventional fiber-optic address detector to one half as well as obtain the same address detection effect.

2 Claims, 2 Drawing Sheets

FIBER-OPTIC ADDRESS DETECTOR IN PHOTONIC PACKET SWITCHING DEVICE AND METHOD FOR FABRICATING THE SAME

BACKGROUND OF THE INVENTION

The invention is related to providing a fiber-optic address detector in a photo packet switching device and a method for fabricating the same.

PRIOR ART

A conventional wired communication network has used copper wires as a medium to transmit signals, but the copper wire is on the way to be replaced with an optical fiber. The optical fiber enables the great expansion of the transmission bandwidth, for the sufficient utilization of which the development of the optic switching technique is required.

A fiber-optic communication technique is a kind of an optical communication code division multiple access method which each bit is coded with its destination address information to form a code sequence and then transmitted to the destination, while other destinations detect addresses to receive the transmitted information. Another technique is a kind of a photonic packet switching method which payload data to be user information is transmitted together with an address header.

The former method enables the transmission/reception between parties together at anytime using the great bandwidth of the single mode optical fiber, but it has a disadvantage in that the number of node receivable in a communication network is limited. Its adoption is almost not performed except for especial cases necessary to keep in secret. The latter method for maintaining the payload information of the packet in a photonic form during the switching process is widely used because of the processing ability of a larger capacity and the high switching speed.

The typical photonic packet switching device includes an fiber-optic coupler for tapping photonic packet signals inputted from an optical fiber cable by about 10%; a laser diode optical amplifier for amplifying the tapped photonic packet signals; a fiber-optic address detector for determining whether its addresses corresponds to the photonic addresses which are inputted passing through an fiber-optic delay line, outputting auto-correlation pulses when the two addresses are identical to each other, otherwise outputting cross-correlation pulses when the two addresses are not identical to each other; and an address coherent discriminator for controlling optical switches to send the photonic packet signals to a receiver if the correlation pulses from the fiber-optic address detector each is larger than a predetermined threshold value or to by-pass the photonic packet signals to next destination if the correlation pulses from the fiber-optic address detector each is smaller than a predetermined threshold value.

In other words, the fiber-optic address detector of the packet switching device for processing the very high-speed broad bandwidth signals has the configuration of a transmission type which enables the fiber-optic coupler to tap part of the photonic packet signal inputted through the optical cable line in order to process addresses. The bits of the photonic address signals tapped are separated by an inputting coupler, delayed through the corresponding delay line and then re-coupled by an outputting coupler. Thus, the inputting address signals can be detected according to the results of the correlation procedure between bit signals to be coupled. In conclusion, the fiber-optic address detector outputs the auto-correlation pulses if the inputting address signals correspond to its address signals. On the contrary, the fiber-optic address detector outputs the cross-correlation pulses if the inputting address signals do not correspond to its address signals.

FIG. 1 shows an example of the fiber-optic address detector including an fiber-optic coupler of 3 dB at a array of 2×2 and an fiber-optic timing delay line (referred to as "an fiber-optic delay line" below), which the number of an address bit "1" is 4. The fiber-optic address detector comprises the 2×2 fiber-optic couplers 1a–1f, the fiber-optic delay lines 2a–2d and optical fibers 3a–3l, among which the optical fibers 3g–3l is not used.

Thus, the optical address signals inputted through the optical fiber 3a are individually separated by the first, second and third fiber-optic couplers 1a to 1c which act to divide a photonic power into two by its own two outputs. Thereafter, each of the address bit "1" is supplied to the first, second, third and fourth outputting fiber-optic delay lines 2a to 2d to be re-coupled by the first, second, third and fourth outputting fiber-optic couplers 1d to 1f. The correlation procedure enables the fiber-optic address detector to detect addresses, optically. In other words, if the inputting address signals correspond to the addresses of the fiber-optic address detector, the fiber-optic address detector outputs auto-correlation pulses. On the contrary, if the two kinds of addresses are identical to each other, the cross-correlation pulses appear at the outputting optical fiber of the third outputting fiber-optic coupler 3f. Herein, it is noted that the identities of corresponding addresses are readily detected using a threshold value detector (not shown) because the central pulse of the auto-correlation pulses has the amplitude larger than that of the cross-correlation pulses.

In light of these points, it is preferable to remove the unused optical fibers as well as to reduce the number of fiber-optic couplers in order to simplify the configuration without deteriorating the performance of a fiber-optic address detector.

The object of the invention is to provide a fiber-optic address detector in a photonic packet switching device and a method for fabricating the same, the configuration of which is simple.

SUMMARY OF THE INVENTION

In order to accomplish this object, the invention comprises a fiber-optic address detector including fiber-optic delay lines on one surface of which a metal thin film is evaporated, the fiber-optic delay lines being connected to fiber-optic couplers, wherein inputting address photonic signals are tapped by the inputting fiber-optic couplers, reflected by the metal thin films at the end portion of the fiber-optic delay line and then re-combined by the inputting fiber-optic coupler, whereby it can reduce the number of the fiber-optic coupler used in the conventional fiber-optic address detector to one half as well as obtain the same address detection effect. Therefore, the invention is exampified as a reflected packet address detector.

BRIEF DESCRIPTION OF THE DRAWINGS

The invention will now be described in detail with reference to the accompanying drawings, in which.

DETAILED DESCRIPTION OF THE INVENTION

Figure 1:
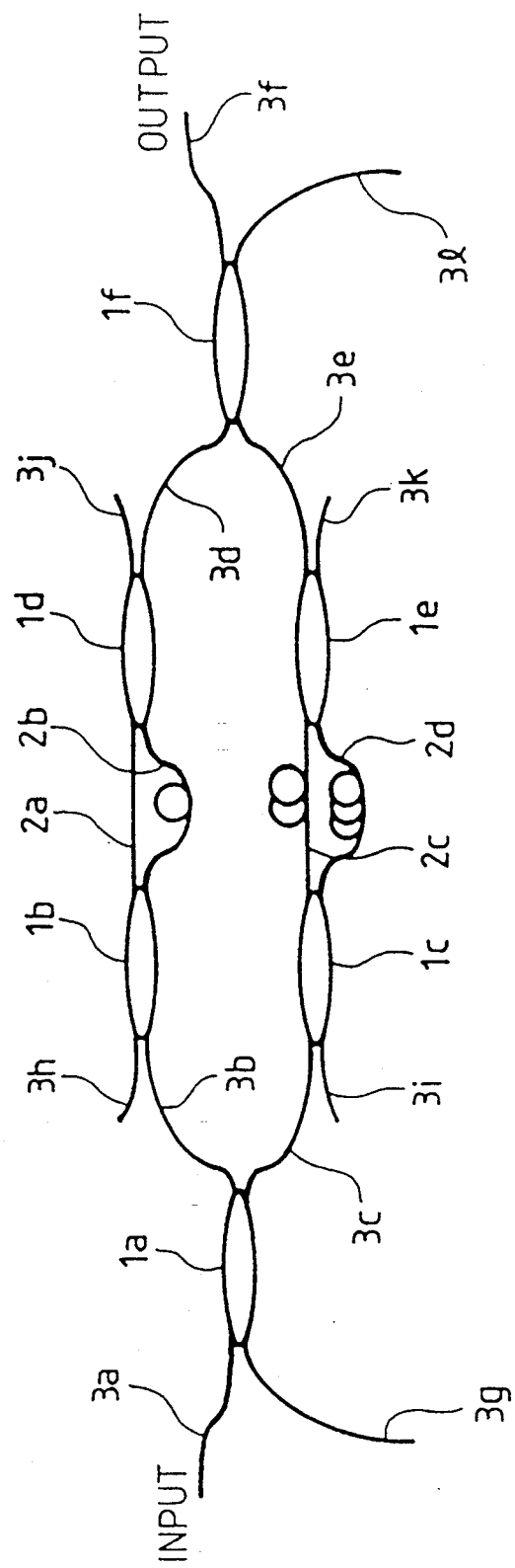
FIG. 1 is a view illustrating a conventional fiber-optic address detector.
Figure 2:
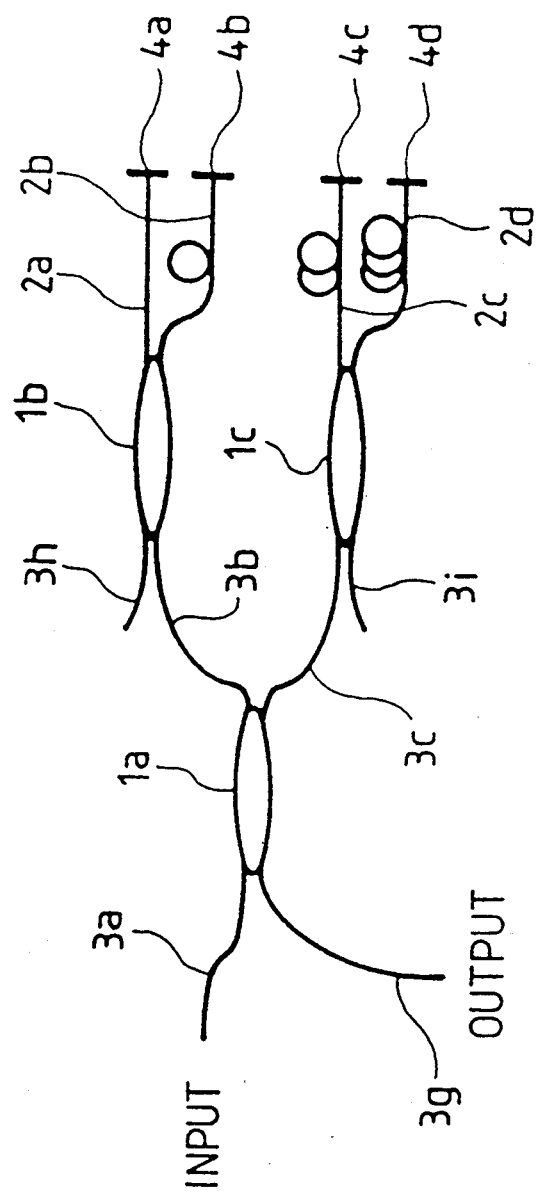
FIG. 2 is a view illustrating a fiber-optic address detector according to the invention.

Referring to FIG. 2, the reference numbers identical to those of a conventional fiber-optic address detector show the same elements as those of FIG. 1. The reference numbers 4a–4d are a metal thin film.

According to the invention, an optical fiber 3g located at the inputting terminal, but is not being used in first inputting fiber-optic coupler 1a, is used as an outputting terminal.

A method for fabricating a fiber-optic address detector according to the invention is as follows:

An optical fiber having a predetermined length is firstly cleaved at the one surface. The optical fiber is arranged in an aluminum case with a groove having a predetermined depth and width being formed at the center, wherein the cross-section of the optical fiber cleaved is extended by a predetermined length of about 5 mm from the end of the aluminum case. The aluminum case is sealed with a cover by means of a screw, so that the optical fibers are not escaped from the groove.

Then, the aluminum case is placed in the vacuum chamber of an electronic beam evaporation apparatus. The cleaved cross-section of the optical fiber is faced to a metal target thereby to evaporate the metal thin film by the thickness to be able to obtain a desired reflection factor.

Thereafter, the aluminum case is picked out from the vacuum chamber and its cover is removed to separate the optical fibers therefrom.

On the other hand, in order to fabricate the fiber-optic address detector that the number of the address bit "1" is 4, an outputting optical fiber is connected in a melting state to one inputting optical fiber 3a of the first fiber-optic coupler 1a, in which the outputting optical fiber is pig-tailed to a laser diode (not shown) for amplifying the inputting photonic signals and generating single microwave pulses. Each of two outputting optical fibers 3b and 3c in the first fiber-optic coupler 1a is connected in a melting state to one inputting optical fiber of the second fiber-optic coupler 1b and one inputting optical fiber of the third fiber-optic coupler 1c. The first, second and third fiber-optic couplers 1a to 1c are a fiber-optic coupler of 3 dB at an array of 2×2.

The position of fresnel pulses is measured on an oscilloscope after passing through a photo-detector, in which the fresnel pulses are reflected from the cleaved outputting optical fibers of the second and third fiber-optic couplers 1b and 1c and outputted to other inputting optical fiber 3g of the first fiber-optic coupler 1a not used in FIG. 1 of a prior art. Thus, the lengths of the first to fourth fiber-optic delay lines 2a to 2d from the positions at the time axes of these pulses to the position corresponding to that of the detector's address code bit "1" are respectively calculated according to the following formula: the fundamental unit length L of the first to fourth fiber-optic delay lines 2a to 2d is equal to ct/2n$_c$, in which the fiber-optic delay lines includes the metal thin films 4a to 4d respectively evaporated on the surface thereof, wherein c is the light velocity (=3×10$^8$ m/sec) passing through the vacuum, t is the time difference between two address bits "1" and n$_c$ is the reflection factor of an optical fiber core. If the velocity of the address bit is 2.5 Gbps (t=1/(2.5×10$^8$)) and the reflection factor n$_c$ is a 1.46, the unit length difference of the fiber-optic delay line between two address bits becomes 4.109 cm.

Thus, if the address bit code including four bits "1" is 101101, four fiber-optic delay lines are required, in which the metal thin films are respectively evaporated on the fiber-optic delay line. For example, on the basis of the length of the optical fiber corresponding to MSB (Most Significant Bit; first bit) the length of the third fiber-optic delay line corresponding to third bit should be longer than that of the first fiber-optic delay line by 2×4, 109 cm. The fourth delay line be longer than 3×4, 109 cm over the first delay line. The sixth delay line be longer than 5×4, 109 cm over the first delay line.

The fiber-optic delay lines determined as above are cleaved so that they are in turn connected in a melting state to each of the outputting optical fiber of the second and third fiber-optic couplers 1b and 1c having a given delay time.

The reflected fiber-optic address detector fabricated as described above outputs the photonic pulse signals r(t) through the second inputting optical fiber 3 g of the first fiber-optic coupler 1a which has the correlation function as follow:

$$r(t) = i(x)f(t-x)dx$$

Wherein, i(x) is the waveform of the inputting address and f(x) is the impulse response of the address detector.

Therefore, if the inputting photonic address code is corresponding to the of the address code of the address detector, the auto-correlation pulses appear at the second inputting optical fiber 3 g of the first fiber-optic coupler 1a. If the two address codes do not correspond to each other, the cross-correlation pulses appear at the second inputting optical fiber 3 g of the first fiber-optic coupler 1a. The central amplitude of the auto-correlation function is in proportion to the number of the bit "1" in the address code. Thus, when the two address codes do not correspond to each other, the inputting photonic address pulse is higher than the central amplitude of the cross-correlation pulses, so that it facilitates the detection of addresses.

As described above, according to the invention the fiber-optic address detector has advantages in that it can obtain the same address detection effect with less number of the fiber-optic coupler over the prior art.

What is claimed is:

1. An address detector in a photonic packet switching device including fiber-optic delay lines corresponding to the number of address bit "1" comprising:

first fiber-optic coupler including at least two inputting optical fibers and at least two outputting optical fibers, in which one inputting optical fiber of said at least two inputting optical fibers is connected to the outputting terminal of an amplifying means and the other inputting optical fiber is used to output a signal;

second fiber-optic coupler including at least one inputting optical fiber connected to one of said at least two outputting optical fibers in said first fiber-optic coupler and two outputting optical fibers;

second fiber-optic coupler including at least one inputting optical fiber connected to one of said at least two outputting optical fibers in said first fiber-optic coupler and two outputting optical fibers; and, said fiber-optic delay lines each connected at one end to one outputting optical fibers of said second and third fiber-optic couplers, in which said fiber-optic delay lines each includes a metal thin film evaporated at its own end portion thereof.

2. A method for fabricating a fiber-optic address detector in a photonic packet switching device comprising the steps:

arranging optical fibers in an aluminum case, in which the optical fibers are cleaved at one surface thereof and the aluminum case includes a groove having a depth and a width at the center thereof, and extending the cross-sections of the cleaved optical fibers from the end portion of said aluminum case;

sealing said aluminum case with a cover by means of screws to prevent the escape of said optical fibers therefrom;

placing said aluminum case in the vacuum chamber of an electronic beam evaporation apparatus;

facing said cleaved cross-section of said optical fibers toward a metal target to be evaporated and evaporating said metal thin films by the thickness to be able to obtain a reflection factor;

picking out said the aluminum case from said vacuum chamber and removing said cover to separate said optical fibers from said aluminum case;

connecting said outputting optical fibers pig-tailed to a laser diode in a melting state to one inputting optical fiber of the first fiber-optic coupler;

connecting each of two outputting optical fibers of said first fiber-optic coupler in a melting state to one inputting optical fiber of said second fiber-optic coupler and one inputting optical fiber of said third fiber-optic coupler; and, measuring the positions of fresnel pulses, which are reflected from said cleaved outputting optical fibers of said second and third fiber-optic couplers and outputted to other inputting optical fiber of said first fiber-optic coupler, calculating the lengths of first to fourth fiber-optic delay lines and connecting said cleaved fiber-optic delay lines in turn connected in a melting state to each of said outputting optical fiber of said second and third fiber-optic couplers having a delay time.

* * * * *